United States Patent [19]

Sutton

[11] 3,945,592

[45] Mar. 23, 1976

[54] AIR REEFING SYSTEM

[76] Inventor: Stephen John Sutton, 16 Edgevalley Drive, Islington, Ontario, Canada

[22] Filed: Apr. 26, 1974

[21] Appl. No.: 464,674

Related U.S. Application Data

[63] Continuation-in-part of Ser. No. 462,027, April 18, 1974, Pat. No. 3,893,641.

[52] U.S. Cl. .............................................. 244/152
[51] Int. Cl.² ........................................ B64D 17/08
[58] Field of Search ........... 244/142, 145, 146, 147, 244/152, 138 R, DIG. 1

[56] References Cited
UNITED STATES PATENTS

| | | | |
|---|---|---|---|
| 2,371,898 | 3/1945 | Lisi | 244/152 |
| 2,970,795 | 2/1961 | Gold | 244/152 X |
| 3,285,546 | 11/1966 | Jalbert | 244/145 |
| 3,393,885 | 7/1968 | Neumark | 244/145 |
| 3,446,458 | 5/1969 | Rogallo | 244/DIG. 1 X |
| 3,506,225 | 4/1970 | Snyder | 244/149 |
| 3,525,491 | 8/1970 | Barish | 244/142 |
| 3,558,087 | 1/1971 | Barish | 244/142 |
| 3,749,337 | 7/1973 | Jalbert | 244/145 |
| 3,756,547 | 9/1973 | Snyder | 244/152 |
| 3,822,844 | 7/1974 | Sutton | 244/145 |

Primary Examiner—Trygve M. Blix
Assistant Examiner—Galen L. Barefoot
Attorney, Agent, or Firm—Stein & Orman

[57] ABSTRACT

An air reefing system of the type to be used primarily in combination with a flexible flow form device. The air reefing system basically comprises a flexible flow form device construction comprising at least three skins of interrelating shape and construction to define a predetermined configuration including a plurality of Jordan clusters formed in the first and second skins and a plurality of holonomic ports formed in the third skin, in combination with air reefing enhancers disposed on the device, whereby the device is both self-inflating and self-reefing upon its exposure to the air.

11 Claims, 21 Drawing Figures

AIR REEFING SYSTEM

This application is a continuation-in-part of my presently co-pending application Ser. No. 462,027, filed Apr. 18, 1974, now U.S. Pat. No. 3,893,641.

BACKGROUND OF THE INVENTION

1. Field of the Invention

The present invention relates to an air reefing system of the type to be used primarily in combination with a flexible flow form device, and specifically to air reefing means disposed on the device.

2. Description of the Prior Art

For as long as man has been utilizing parachute structures, he has recognized serious problems associated with opening the parachute upon its deployment and coping with the tremendous opening shock normally associated with the inflation of parachute devices. In recognition of these problems, numerous devices are known in the prior art for insuring that parachutes will open, and for reducing the attendant opening shock. These prior art devices are generally referred to as reefing assemblies and generally take the form of various restraining means, whereby inflation of the parachute may be controlled in a predetermined fashion. Such devices are generally thought of as contributing positively to both the comfort and safety of parachute deployment. However, a study of the prior art devices reveals that numerous problems associated with reefing assemblies remain unsolved. Most importantly, prior art reefing assemblies simply are not sufficiently reliable in operation.

U.S. Pat. No. 3,278,143, discloses a parachute canopy reefing at panel center lines. The mid-panel reefing means is mounted inside the base of the canopy on a reinforcing band around the bottom edge portion of the canopy and basically comprises reefing line guide rings, a reefing line, and reefing line cutters. By its terms, the mid-panel reefing means is limited in its application to those parachute canopys in which the shroud lines are connected around the canopy to the skirt at equal circumferentially spaced points. It is therefore apparent that the reefing means disclosed by this patent would not be applicable to today's ram air parachutes. Just as clearly, this reefing means would have no application to the flow form device disclosed in my presently pending application referred to above. However, dismissing its inapplicability to various specific parachute structures, the reefing means disclosed therein is clearly subject to mechanical malfunction because of its construction. The reefing means cannot operate properly if the reefing line becomes twisted or tangled. Failure of the reefing line cutters to operate properly would prevent the parachute from fully inflating. Finally, as the reefing line is pulled through the reefing line guide rings, the resultant frictional forces create heat which could result in burning through the parachute canopy.

A rereefing parachute assembly and system is disclosed in U.S. Pat. NO. 3,434,680. An express purpose of the invention disclosed therein is to provide an improved parachute suitable for towing which may be released while in tow and will then reopen to allow the payload to make a normal descent. This reopening, or rereefing, effect is accomplished by means of the suspension and rigging assembly disclosed therein. The suspension and rigging system result in a pulling down of the central portion of the main parachute, which provides a much larger area over which the opening shock pressures are distributed. This distribution of pressure during opening minimizes damage to the canopy of the main parachute. However, because the assembly depends on its suspension and rigging for its effectiveness, the device is still subject to mechanical malfunction resulting primarily from tangled lines. Furthermore, such a construction has been known to result in complete failure as a result of canopy inversion.

U.S. Pat. No. 3,506,225, relating to an opening shock inhibitor for parachutes, discloses the use of one or more reefer straps secured at fixed locations to the canopy and/or the load lines and wrapped thereabout so as to slowly unwind after the canopy is released from its enclosure and the load lines are deployed. This patent teaches that unwrapping of the reefers delays inflation of the canopy to regulate opening shock. The disclosure of this patent further teaches that the effectiveness of the reefer strap in delaying complete inflation in opening of the parachute is enhanced by preventing unwrapping of the strap until inflation of the canopy has begun. This result is accomplished through the use of releasable holding devices comprising "Velcro" fabric fastener portions mounted on the reefer strap. In effect then, a parachute employing these shock inhibitors is tied together at predetermined points by the reefer strap. Internal pressures resulting from inflation of the parachute canopy overcome the restraining forces of the reefer straps, thus breaking their hold and allowing the parachute to fully inflate. Obviously, if sufficient internal pressure is not created to overcome the restraining force of the reefer straps, the parachute cannot perform its intended preface. Just as obviously, if the reefer straps release prematurely, there will be no inhibition of opening shock.

A pilot chute controlled inflation system for parachutes is disclosed in U.S. Pat. No. 3,540,684. The drag of a pilot chute initiates inflation of a canopy to which it is connected by at least one continuous reefing line having a timed length to regulate dereefing and opening of the canopy. The drag force of the pilot chute is distributed in a stabilizing surface to the canopy at spaced locations by guide rings through which the reefing line extends. In fact, the embodiment of this invention shown in FIG. 4 is used today on substantially all ram air parachutes. With particular reference to this embodiment, it should be noted that ram air parachutes depend upon maintaining approximately a 28° angle of attack along their leading edge to fly properly. Their construction accordingly results in the creation of areas of relatively greater air pressure at the two outboard edges of the device, and an area of relatively least air pressure at the center of the device. Thus, ram air parachutes tend to inflate from their outboard edges toward the middle. Such inflation necessarily creates flight instability during the opening sequence, and may even result in complete failure of the device. Accordingly, the system disclosed in U.S. Pat. No. 3,540,684, has as one of its primary objectives, means for reversing the normal opening sequence of ram air parachutes. That is, the device of this patent "forces" the ram air parachute to open from the middle, outwardly. This result is accomplished by the drag force of the pilot chute on the reefer lines tending to collapse the outboard cells toward the middle of the ram air parachute. Of course, inflation of the parachute pulls against, and subsequently overcomes, this pilot chute drag force.

It is therefore apparent that the effectiveness of the pilot chute controlled inflation system relates most directly to the size of the pilot chute. As the main parachute opens, the pilot chute is in its wake; therefore, its drag is reduced. Reefing then becomes a matter of friction between the reefing lines and the corresponding guide rings. Unfortunately, the friction of the reefing line as it passes through the guide rings and as it passes over the top surface of the parachute often results in burns and tears, resulting in parachute failure. Similarly, if the reefing line becomes twisted or tangled about itself or about the guide rings, the parachute cannot inflate properly. Finally, since the operation of this system is most directly related to the size of the pilot chute, if the pilot chute does not inflate properly, the main parachute will not properly inflate.

Yet another attempt at solving the problems associated with parachute opening shock is shown in U.S. Pat. No. 3,642,237, relating to a spiral reefed variable drag parachute. That patent teaches the use of a plurality of reefing lines positioned about the parachute canopy in a spiral shaped manner whereby the drag of the parachute is varied by actuating control means. This device is particularly susceptible to malfunction occasioned by tangling and twisting of the many reefing lines. The device is furthermore susceptible to malfunction as a result of burning and tearing the parachute canopy as the reefing lines pass through their respective grommets.

Finally, U.S. Pat. No. 3,652,041, discloses a reefing device including a cord or band disposed in confining relation around the parachute and connected to a releasing means which is responsive to the amount and duration of the forces applied thereto. Until it is released, the band encircles the canopy and serves to restrain the canopy so as to retard its full deployment until it has been disconnected by the releasing means. Accordingly, the releasing means is the critical element of this reefing device. The releasing means is disclosed as comprising a cylinder and piston assembly including a cylinder and a piston which are relatively movable in response to forces applied to the band placed in restraining relation around the canopy. Obviously, if the cylinder and piston assembly fails, the parachute will not open properly. Even if this reefing device does function properly, it is undesirable because of its mechanical complexity. This mechanical complexity not only increases its probable failure rate and maintenance requirements, but also results in a relatively expensive reefing device.

It is thus apparent that there is a great need in the art for a reefing system which eliminates the problem of opening shock to the maximum possible extent without interferring with the parachute's normal opening sequence. For reasons of safety and economy, the reefing assembly should be self-operating, requiring no external control means. For these same reasons the reefing system should comprise the fewest possible number of elements in addition to the basic parachute structure. Ideally, the basic reefing system would in fact comprise the parachute structure, with reefing means added for the purpose of enhancing the parachute's self-reefing tendencies. Of course, the dangers normally associated with friction and tangling in present reefing systems must be eliminated to the maximum possible extent. Additionally, such a reefing system should utilize existing air flow pressures created within and without the device in a manner that will not detract from the device's stability and maneuverability characteristics. Finally, such a reefing system should automatically disengage upon substantially full inflation of the device.

SUMMARY OF THE INVENTION

This invention relates to an air reefing system of the type used primarily in combination with a flexible flow form device. More specifically, this invention is primarily intended for use with the flow form device disclosed in my presently co-pending application referred to above. Accordingly, while the reefing system of this invention will be discussed in terms of its utilization in a gaseous environment, it should be obvious that the principles of the present air reefing system have equal application in virtually any fluid environment.

It has been determined that the characteristics exhibited by a form as it passes through a fluid environment are determined primarily by four variables and their relationship to each other. These variables have been designated skins I, II, and III, and payload IV respectively. Skin I is defined by the top skin of the flow form device. Skin II is defined by the bottom skin of the device. Skin III includes a plurality of rib-like structures running from the leading edge of the device to its trailing edge, and interconnecting skins I and II. Payload IV refers to the payload which is attached to the device and which is transported through the fluid environment by the device, and the means for attaching the payload to the device.

Accordingly, the flow form device basically comprises a first skin means of predetermined configuration, a second skin means in corresponding predetermined configuration disposed beneath and in corresponding relation to the first skin, third skin means disposed in interconnecting relation between the first and second skins, and a payload means attached to and generally depending from, the device. The volume defined at its perimeters by the first, second and third skins is defined as a spor means; thus, the flow form device must include at least one spor means. However, skin means I, II and III may be configured and dimensioned to include any number of spor means greater than one. It should also be apparent that the shape and cubic displacement of any individual spor means are determined by the relative disposition of the first, second and third skins, and that this relative disposition may, in turn, vary depending upon the overall configuration of the device. One end of the spor means at least partially defines the leading edge of the device, and the trailing edge of the device is defined by at least a portion of the spor means being closed at its opposite ends.

It has been determined that it is desirable to form air passages at various predetermined points along skin means I, II and III for the purpose of enhancing the stability and maneuverability characteristics of the device. These air passages also serve as automatic reefing means, controlling the inflation of the device so as to reduce opening shock and insuring proper inflation. As will be discussed in more detail hereinafter, all that is necessary to provide a complete air reefing system for the device is the addition of air reefing means. The air passages formed through the first skin means are termed first Jordan clusters; those formed through the second skin means are termed second Jordan clusters; those formed through the third skin means are termed holonomic ports. The first and second Jordan clusters and the holonomic ports are formed in the device so that each spor means communicates with at least one of each type air passage. Thus, there is maintained a constant three dimensional flow of fluid in terms of pressures, volumes and rigidity, through the device. It is this three-dimensional flow of fluid which allows the device to reef itself. Air enters the device primarily through the second Jordan clusters formed in the second skin means. Air exits the device primarily through the first Jordan clusters formed in the first skin means. Finally, air passes between adjacent spor means through the holonomic ports formed in the third skin means. Control of the three-dimensional air flow in terms of pressures, volumes and rigidity is accomplished by the relative disposition and size of individual first and second Jordan clusters and holonomic ports. Accordingly, their relative disposition and size may be varied, resulting in a corresponding variance in the self-reefing capabilities of the device.

By virtue of the construction of the device, it actually "reads" its fluid environment with respect to skin means I, II, and III, and payload IV. Skins I, II and III are self-forming to terms of demands transmitted from the payload means and to changes in the fluid environment. The interrelationships of each individual element of the device to its other elements result in a device construction which generates two mirror image quadratic fluid flow forms with respect to a plane perpendicular to skin means I and II and parallel to skin means III through the center of the device. Each quadratic fluid flow form comprises four pentahedral fluid flow forms having mutually orthogonal apex sectors disposed about the center of a quadratic fluid flow form. This construction therefor provides an intrinsic parametric transitive flow form device which permits a non-degenerative transformation of fluid flow pressures in a fluid environment.

It is by virtue of this construction that the device requires no external reefing system when formed from flexible material for use in a gaseous environment. Rather, it is only necessary that the air reefing system be enhanced by the addition of air reefing means to the device. As the device travels through its environment, its construction results in determinable air flow pressures within the device. For example, a volume of relatively greatest air flow pressures is defined by determinable points around the middle of the device. Conversely, volumes of relatively lesser air flow pressures are created along the outboard edges of the device. This results in the device tending to open from its center, outwardly.

At this point, it should be noted that the fluid flow pressures created within the flow form device are virtually the opposite of the pressures created within conventional ram air parachutes. That is, today's ram air parachutes have the areas of greatest pressure along their outboard edges, and an area of least pressure at the middle of the device. Therefore, ram air parachutes tend to inflate at the outboard edges first. This results in undesirable, erratic flight characteristics during the opening sequence. Thus prior art reefing devices have sought to overcome this natural opening sequence by providing various external means for "forcing" ram air parachutes to open from the middle, outwardly. Obviously, such external means need not be used in combination with a flow form device.

As previously stated, however, it has been determined that it is desirable to enhance the natural reefing tendencies of a flow form device by the addition of air reefing means. The air reefing means of the present invention may take the form of any of a number of embodiments. A single embodiment may be utilized on the device, or combinations of embodiments may be utilized. Of course, the type and number of embodiments chosen is determined by the degree to which it is desired to control the reefing characteristics of the device.

One effective air reefing means comprising one embodiment of the present invention includes, fastener means disposed in mating relation on the third skin means of the device along a predetermined portion, and preferably substantially the entire perimeter, of adjacent pairs of holonomic ports. The fastener means may include male and female fastener means comprising lengths of "Velcro" material. When the flow form device is folded for packing, corresponding male and female fastening means engage, tending to retain the device in a folded, accordion-like configuration. When the device is released from its container and exposed to the air, it will naturally tend to inflate from the middle, outwardly. However, this natural inflation will now be controlled somewhat from spor means to spor means because sufficient air flow pressure, volume, and rigidity must now be obtained within an individual spor means to "break" the connection between corresponding male and female fastener means thus allowing the next outboard spor means to inflate. Accordingly, inflation across the device is retarded, further reducing opening shock.

Another embodiment of the air reefing means comprises a plurality of male and female fastener means disposed in mating relation on the third skin means, and substantially perpendicular to the third skin means, between adjacent pairs of holonomic ports. As above, these male and female fastener means preferably comprise lengths of "Velcro" material. However, unlike the male and female fastener means discussed in the immediately preceding paragraph, the male and female fastener means of this embodiment engage each other in overlapping rather than abutting relation. Greater air flow pressure, volume and rigidity are required to disengage such an overlapping connection. Of course, the forces required for disengagement may be controlled by varying the width of corresponding fastener means or by varying the extent to which they overlap.

It should be noted that both these embodiments for air reefing means are completely self-disengaging. Furthermore, there is virtually no chance of either of these means becoming tangled or creating frictional heat which could damage the device, either of which could result in a device malfunction.

Yet another air reefing means embodiment comprises at least one biasing means disposed in interconnecting relation between pairs of third skin means defining side walls of the device spor means. The biasing means preferably comprises an elastic material of predetermined length such that interconnected third skin means are normally urged one toward the other. This necessarily results in an accordion-like folding of the device. It is furthermore desirable to attach the biasing means to the third skin means frangibly, so that the biasing means will automatically disengage substantially full inflation of the device. This embodiment serves to control and enhance the reefing characteristics of the device by requiring that sufficient air pressure, volume and rigidity be created within each spor means to overcome the biasing means as the device naturally inflates from its middle, outwardly. As above, it should be noted that this embodiment also virtually elminates any chance of device malfunction occasioned by tangling or frictional heat. Obviously, the reefing effect of this embodiment may be controlled by varying forces exerted by the biasing means.

Yet another embodiment for the air reefing means of this invention comprises retention line means disposed at least partially within the device in interconnecting relation between the outermost third skin means. This retention line means comprises a plurality of lines, at least one of which is attached at one end to the interior surfaces of the outermost third skin means. Additionally, a plurality of guide means are disposed within the device and depend from substantially the midpoint of the first skin means, and a plurality of apertures are formed through the second skin means in corresponding relation to the guide means. Each of the plurality of lines preferably extends from the outermost third skin means through the holonomic ports, through one of the plurality of guide means and through one of the plurality of apertures of the exterior of the device. At a predetermined point outside the device, connector means is formed whereby the lines are joined together, and lanyard means extend from the connector means in substantially coextensive relation with control means formed on the device. The lanyard means is simply a length of material similar to that from which the control means is formed. Accordingly, when the lanyard means is pulled downwardly, as in folding the device, a contracting force is exerted on each of the outermost third skin means tending to fold the device in an accordion-like fashion. The plurality of lines are preferably frangibly attached to the outermost third skin means so to automatically disengage upon substantially full inflation of the device. Alternatively, automatic disengagement may be accomplished by forming each of the lines to include a weakened portion which will sever upon substantially full inflation of the device. As will be discussed in more detail hereinafter, it may further be desirable to form the plurality of lines and/or the lanyard means from substantially elastic material. In operation the retention line means enhances the self-reefing capabilities of the device by using the weight of the payload means depending from the device to transmit contractng forces to the outermost third skin means. These forces are transmitted by attaching the lanyard means to the payload means. Thus, as the device self-inflates, sufficient air pressure, volume, and rigidity must be maintained to overcome the pull of the payload means.

It has further been determined that the reefing capabilities of the flow form device maya be controlled and enhanced by air reefing means comprising a plurality of slit means formed at predetermined points through the first and second skin means. It is further desirable that the slit means include a plurality of flap means formed in overlapping relation thereto. Flap means formed in overlapping relation to slit means formed on the first skin means are formed on the exterior of the first skin means, and flap means on the second skin means are formed on the interior of the second skin means. While the exact construction and placement of this air reefing means embodiment will be discussed hereinafter in greater detail with regard to a preferred embodiment, it is sufficient to note at this point that the slit means perform essentially as additional escape paths for air pressure within the device, thus delaying full inflatation of the device. Furthermore, it should be noted that this embodiment is primarily intended for use in combination with extremely heavy payload means. Once the device is fully inflated, the flap means will seal the slit means, thus effectively disengaging this air reefing means embodiment automatically. It is obvious that this embodiment has virtually no chance of tangling, tearing or burning the device, for it includes no reefing lines whatsoever.

It has further been determined that the reefing capabilities of the flow form device are enhanced by wetting the device prior to its deployment. Accordingly, the air reefing means of this invention may comprise liquid jacket means including a liquid-tight container means into which the device is releasably packed, the container means being filled with liquid prior to being sealed. While virtually any non-corrosive liquid could be used, water is preferred for reasons of economy and availability. This liquid jacket means enhances self-reefing characteristics by cooling the device as it rubs against itself during the inflation sequence and by adding weight to the device. It enchances the self-reefing characteristics by virtue of the cohesive attraction between water molecules interconnecting folded layers of the device. As the device naturally inflates from its center, sufficient air pressure, volume and rigidity must be generated to overcome the water's forces of cohesion, thus slowing full inflation and reducing opening shock.

Finally, the air reefing means may comprise a plurality of closure means formed at predetermined points across the leading edge of the device to provide a relatively lesser flow of air into the device. In a flow form device constructed to define an open leading edge, this opening obviously allows large quantities of air to enter the spor means upon deployment of the device. Accordingly, by selectively closing portions of the leading edge, less air is available to inflate the device. The device inflates more slowly, and opening shock is correspondingly reduced.

While each of the foregoing air reefing means has been discussed as a separate entity, it is to be remembered that the air reefing system of the present invention may comprise any combination of these air reefing means in combination with a flow form device as thus far defined.

In accord with the disclosure of my co-pending application referred to above, it has been found desirable to construct the flow form device to further include jiro port means and jet port means. The jiro means is formed in the second skin means around the mid-point of the second skin. The jiro port means is formed in a substantially circular configuration, and the size of its diameter is predetermined in relation to the size of the first and second Jordan clusters. At this point, it is sufficient to note only that the jiro port means is substantially larger then any of the Jordan clusters or holonomic ports. Accordingly, the jiro port means provides a ready access for large quantities of fluid to enter and exit the device. As fluid enters the jiro port means, it creates flow pressures which interact with the flow pressures already present in the device as a result of the first and second Jordan clusters and holonomic ports. These flow pressures combine to form a substantially spherical cushion of fluid on which the device travels. Because the spherical cushion is always present at the center of the device as it travels through fluid, it is termed an intransitive hub. Because the surface of this intransitive hub is formed from the combined fluid flow pressure within the device, the intransitive hub is said to have spherical surfaces of transitivity.

Though this intransitive hub is invisible inasmuch as it is formed as result of the combining of fluid flow pressures, its presence within the device is immediately identifiable in the form of a hump, or bubble, formed in the first skin means immediately above the jiro port means. To insure the structural integrity of the device, root cross stem enforcer means are formed in skin I in corresponding relation to the jiro port means. Similar root cross enforcer means may be formed in the outermost third skin means in corresponding relation to the holonomic ports. The root cross stem enforcer means not only strengthens the device, but also it and the root cross enforcer means are constructed to allow excess fluid pressures to exhaust from the device.

The jet port means is defined by a portion of the spor means being open at its aft end. As should be obvious, the jet port means provides an exhaust for the fluid flow pressures formed within the device, necessarily tending to move the device horizontally with a corresponding enhancement of vertical stability and maneuverability. To fully utilize the energy generated by this exhaust of fluid flow pressures, the device further comprises transitive manifold means formed between the first and second skin means in communicating relation between the intransitive hub and the jet port means. The transitive manifold comprises a truncated pentahedron including an open apex' disposed in communicating relation with a portion of the spherical surface of the intransitive hub. The transitive manifold further comprises an open base co-extensive with the jet port, and side walls of substantially equal lengths extending radially from the perimeter of the intransitive hub in interconnecting relation between the first and second skin means. The side walls need not be continuous, but may take the form of a plurality of spaced apart strut means. That is to say, it is not necessary that the manifold side walls block the flow of fluid within the device. In fact, even in the complete absense of side walls, the fluid flow pressures within the device accomplish substantially the same result. In fact, fluid flow pressures within the device actually create a reverse transitive manifold in corresponding relation to the transitive manifold in the forward half of the device.

Construction of the flow form device to include jiro port means and jet port means in addition to the first, second and third skin means, first and second Jordan clusters, and holonomic ports as previously defined, serves to reinforce the self-reefing capabilities of the device. The center of such a flow form device exhibits the greatest air pressure, flow and rigidity as a result of the formation of the intransitive hub. The jiro port means is obviously the largest and therefore the easiest inlet for air immediately upon deploying the device; thus, such a device inevitably tends to open from its center, outwardly. To prevent extreme opening shock, the transitive manifold means, jet port means, root cross stem enforcer means, and reverse transitive manifold automatically exhaust excess air. Once the center of the flow form device, termed the domain spor, is fully inflated and the intransitive hub is formed, air is automatically directed through the holonomic ports to the outermost, or tensor spors. Thus the flow form device naturally tends to inflate in an accordion-like fashion. Furthermore, because the payload means is suspended from the center of this flow form device, it does not depend upon scooping quantities of air along its leading edge in order to inflate. In fact, no angle of attack along the leading edge of the flow form device is required; rather, the device prefers to open perfectly flat.

Thus, the jiro port means, jet port means, transitive manifold means, and reverse transitive manifold all function to enhance and back up the self-reefing capabilities initially derived from the first and second Jordan clusters and the holonomic ports. It should be noted that by varying the relative size and placement of first and second Jordan clusters with respect to each other and also with respect to the holonomic ports, one can correspondingly vary the relative speed of inflation of the device. Changes in relative disposition would be made to correspond to varying the geometrical configuration of the device, for the device may be constructed to define a circular configuration presenting virtually no leading or trailing edge, to define an equilateral triangular configuration presenting its base as the leading edge and its apex as the jet port, or any possible configuration between these extremes. Varying the relative sizes actually varies the relative speed of opening and the corresponding opening shock. Of course, it is intended that any of the air reefing means described above may be used in combination with this flow form device as now defined. The construction and operation of the air reefing means would be substantially the same as that described above.

In order to maximize even further the stability and maneuverability characteristics of the flow form device, it was found desirable to incorporate fluid flow regulating means in the structure of the device. Accordingly, the device may further comprise at least first and second fluid flow regulating means integrally formed on the first, second and third skin means in fluid communicating relation to the closed portion of the spor means. One end of each of the fluid flow regulating means actually defines the trailing edge of the device; therefore, the fluid flow regulating means may be visualized as extensions of the closed spor means. In keeping with the purpose of maximizing stability and maneuverability characteristics, each of the fluid flow regulating means is operably independent one from another. It was further found desirable to correspondingly vary the longitudinal dimension of each fluid flow regulating means with respect to the third skin means of the device. That is, the trailing edge of the device including these fluid flow regulating means defines a wing-like taper extending from points substantially adjacent the jet port means to the outboard edge of the outermost, or tensor, spors. The fluid flow regulating means further comprise a plurality of matrix tri-vent means formed in the second skin means thereof, and a plurality of second holonomic ports formed in the third skin means thereof. While it was originally noted that the fluid flow regulating means materially enhanced the stability and maneuverability characteristics of the device because of their functioning as thrusters, stabilizers, and additionally conduits for the passage and control of fluid flow pressures created within and without the device, it has now been determined that these fluid flow regulating means materially enhance the self-reefing capabilities of a flow form device upon its deployment. More specifically, the wing-like trailing edge defined by the fluid flow regulating means is important to the present air reefing system. By virtue of this taper, the spor means adjacent the domain spor define the relatively smallest longitudinal dimension with respect to the third skin means, and the tensor spor define the relatively greatest such dimension. Thus, spor means adjacent the domain spor tend to inflate before more outboard spor means, with the tensor spors being last to inflate. This necessarily enhances the accordion-like inflation sequence of the flow form device. The matrix tri-vent means obviously provides yet additional conduits through which the device may exhaust excess air pressures, thus tending to reduce opening shock. Finally, the second holonomic ports allow each of the first and second fluid flow regulating means to "read" air pressures across their width, thereby transferring excess pressures and assisting in a smooth opening sequence from the center of the device, outwardly. As above, it is of course intended that any of the air reefing means described above may be employed in combination with a flow form device including first and second fluid flow regulating means.

This invention accordingly comprises an article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figures 1, 5, 6, 7, 8:
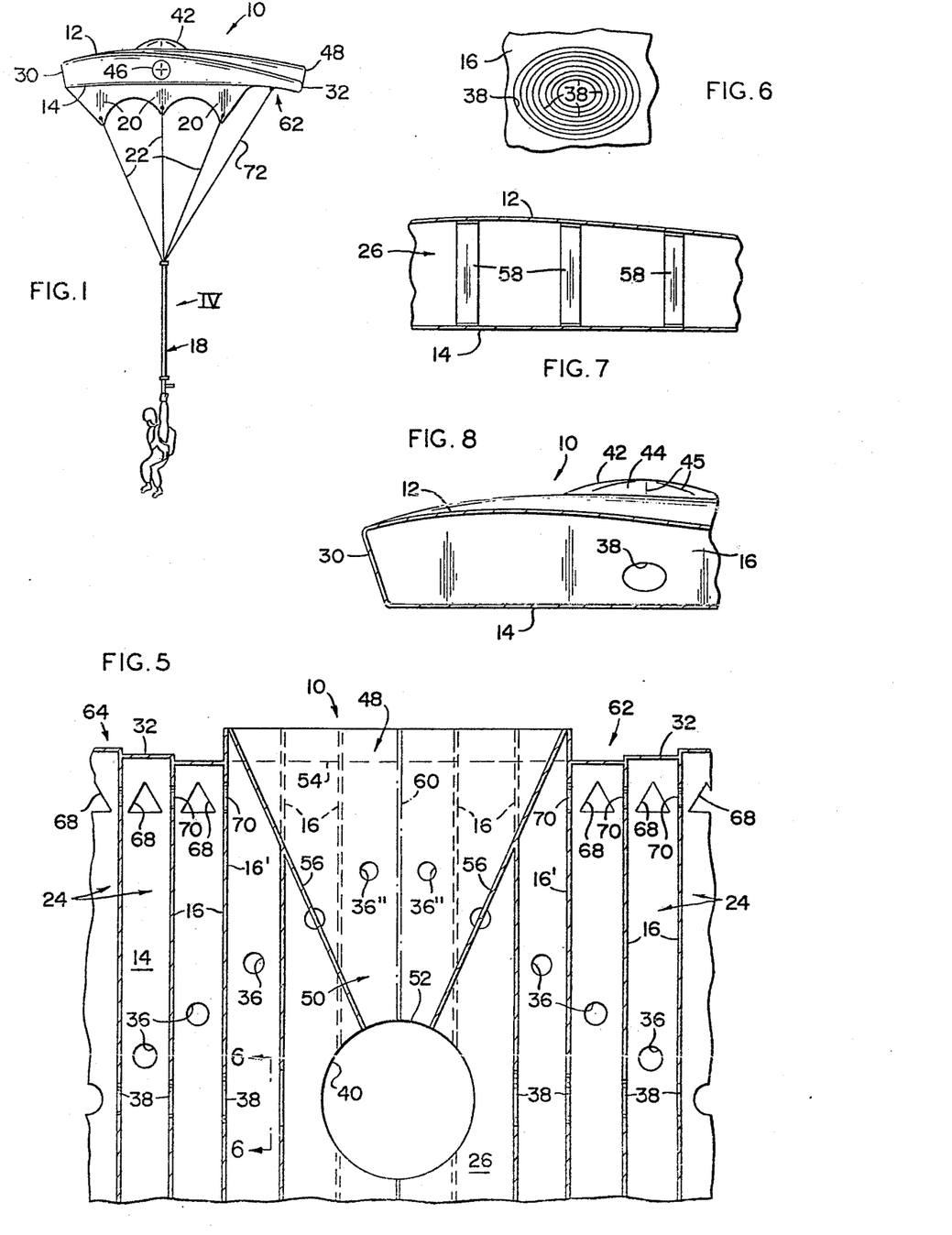
FIG. 1 is an elevational view of a preferred embodiment of the flow form device.
FIG. 5 is a detailed plan view of a portion of the bottom of the flow form device shown in FIG. 3.
FIG. 6 is a segmentary sectional view taken along line 6—6 of FIG. 5.
FIG. 7 is a segmentary elevational view of a portion of the transitive manifold side walls.
FIG. 8 is a segmentary sectional view similar to that of FIG. 4 showing an alternate embodiment for the leading edge of the flow from device.

This invention relates to an air reefing system of the type used primarily in combination with a flexible flow form device, generally indicated as 10 in FIG. 1. While the ensuing detailed description will be given with reference to a particular embodiment of flow form device 10, it is to be remembered that the air reefing system of the present invention is intended for use in combination with any applicable flow form device. Accordingly, while the air reefing system of this invention is discussed in terms of its utilization in a gaseous environment, it should be obvious that the principles of the present air reefing system have equal application in virtually any fluid environment. Furthermore, while each of the air reefing means of the present invention will be discussed as separate entities, it is to be remembered that the air reefing system may comprise any combination of these air reefing means.

Figure 2:
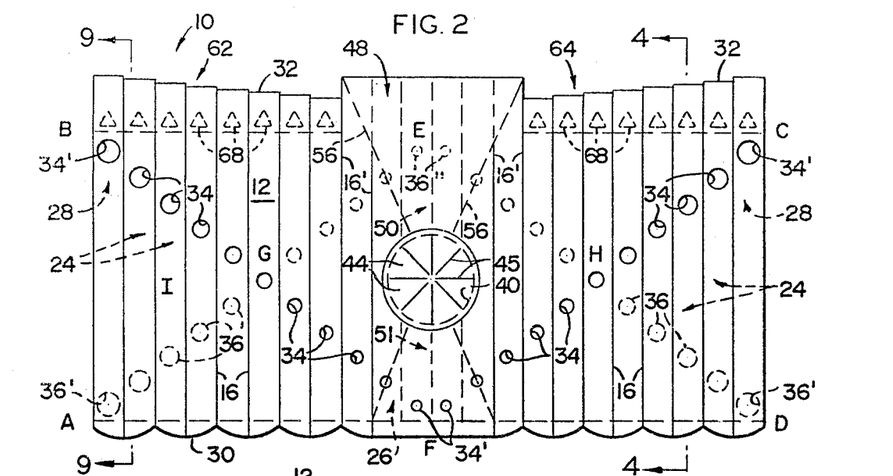
FIG. 2 is a top plan view of the flow form device.

Flow form device 10 comprises a first skin means 12 of substantially rectangular configuration, a second skin means 14 of substantially corresponding configuration disposed beneath and in corresponding relation to first skin means 12, a plurality of third skin means 16 disposed in interconnecting relation between the first and second skin means 12 and 14, and a payload means, generally indicated as 18 in FIG. 1, depending from the device. The payload means 18 depends from the device from substantially equilateral wedges 20 formed on second skin means 14 by means of shroud lines 22. A plurality of spor means, generally indicated as 24 in FIG. 2, are defined by the first skin means 12, the second skin means 14 and the third skin means 16. The centermost spor means is domain spor 26, and the outermost spor means are tensor spors 28. Obviously, the shape and cubic displacement of any individual spor means 24 are determined by the relative placement of the first, second and third skin means 12, 14 and 16, respectively. One end of spor means 24 defines leading edge 30 of the device, and trailing edge 32 of the device is defined by at least most of spor means 24 being closed at their opposite ends.

Figure 3:
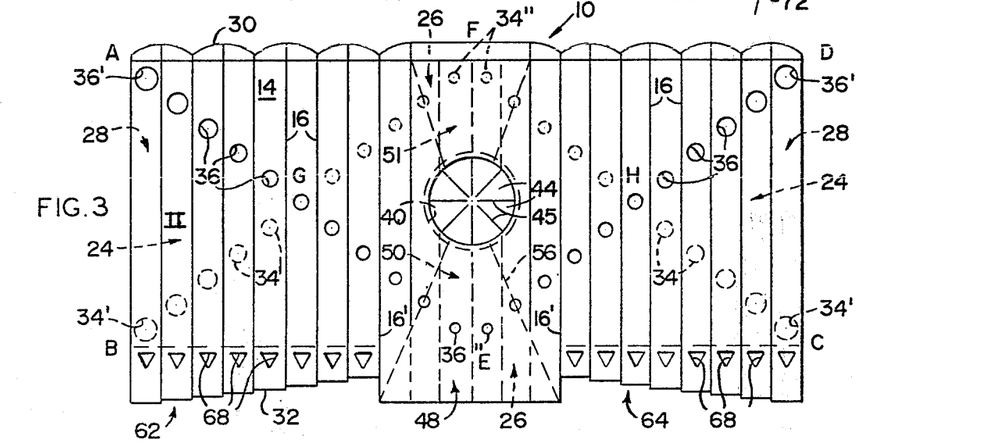
FIG. 3 is a bottom plan view of the flow form device.
Figure 4:
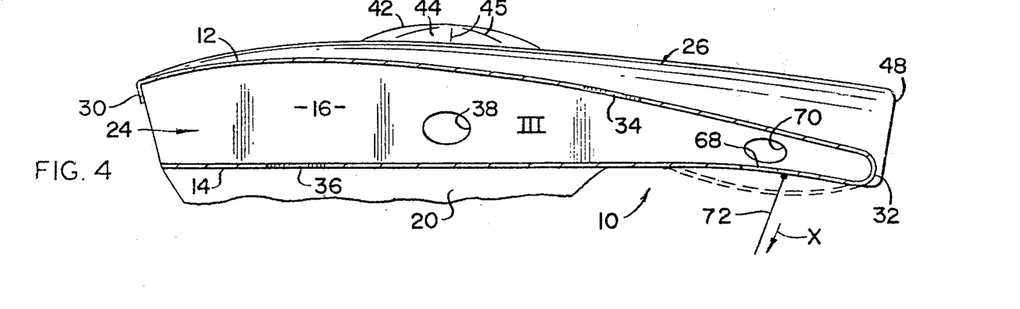
FIG. 4 is a sectional view taken along line 4—4 of FIG. 2.

Referring now to FIGS. 2, 3, and 4, air passages are formed at various predetermined points along skin means I, II and III. First Jordan clusters 34 are formed in first skin means 12. Second Jordan clusters 36 are formed in second skin means 14, and first holonomic ports 38 are formed in third skin means 16. As best seen in FIG. 4, each spor means 24 communicates with at least one of each air passage, 34, 36 and 38. Holonomic ports 38 are formed in third skin means 16 with their centers substantially parallel to leading edge 30. Furthermore, holonomic ports 38 are preferably elliptical in shape in order to allow third skin means 16 to "flex" in response to varying fluid pressures within the device. As shown in FIG. 6, holonomic ports 38 are of decreasing size, the largest holonomic ports 38 being formed in third skin means 16 which define the side walls of domain spor 26 and the smallest holonomic ports 38 being formed in third skin means 16 defining inboard side walls of tensor spors 28. The largest first holonomic port 38 is twice the size of the smallest first holonomic port 38.

As best seen in FIGS. 2 and 3, first Jordan clusters 34 and second Jordan clusters 36 comprise substantially circular air passages. First Jordan clusters 34 and second Jordan clusters 36 are spaced apart longitudinally one from the other on first skin means 12 and second skin means 14 respectively, in inverted V configurations. Of course, at the two points where these V configurations intersect, a first Jordan cluster 34 is congruent with respect to a correspondingly positioned second Jordan cluster 36. It should also be noted that first Jordan clusters 34 and second Jordan clusters 36 are of correspondingly reducing diameter along their respective V configurations. First and second Jordan clusters 34 and 36 which are of equal size communicate with a common spor means 24. Largest first and second Jordan clusters 34' and 36' are formed in communicating relation with tensor spors 28, and smallest first and second Jordan clusters 34'' and 36'' are formed in communicating relation with domain spor 26. First and second Jordan clusters 34' and 36' are twice the size of first and second Jordan clusters 34'' and 36''.

Device 10 further includes jiro port means 40 formed in second skin means 14 around the midpoint of second skin means 14. Jiro port means 40 is substantially circular in configuration, and its diameter is four times the size of the diameter of the largest first and second Jordan clusters 34' and 36'. Fluid flowing through jiro port means 40 reacts with fluid flow pressures already present within the device by virtue of first Jordan clusters 34, second Jordan clusters 36 and first holonomic ports 38 to form a cushion of fluid on which the device travels. This substantially spherical cushion is defined as an intransitive hub and its presence is identifiable in the form of a protrusion or hump 42 in first skin means 12, best seen in FIGS. 1 and 4. To insure the structural integrity of the device, root cross stem enforcer means 44 is formed in first skin means 12 in corresponding relation to jiro port means 40. Root cross stem enforcer means 44 not only strengthens the device, but is also provided with slits 45 whereby excess fluid pressures may automatically exit from the device. As best seen in FIG. 1, the outermost walls of tensor spors 28 may also include similarly constructed root cross enforcer means 46 formed therein for the automatic bleeding of excess fluid pressures.

Device 10 further includes jet port means 48 defined by a portion of spor means 24 being open at their aft ends. Jet port means 48 provides a ready exhaust for fluid flow pressures formed within the device, necessarily tending to maneuver and move the device both horizontally and vertically. A transitive manifold means 50 is formed between first skin means 12 and second skin means 14 in communicating relation between the intransitive hub formed above jiro port means 40 and jet port means 48. A detailed view of this structure for jiro port means 40, jet port means 48 and transitive manifold means 50 is shown in FIG. 5. As represented by the broken lines in FIGS. 2 and 3, a reverse transitive manifold means 51 is formed in the forward half of the device in corresponding relation to transitive manifold means 50.

With particular reference to FIG. 5, it is seen that transitive manifold means 50 comprises a truncated pentahedron including an open apex 52 disposed in communicating relation with a portion of the spherical surface of the intransitive hub, and an open base 54 co-extensive with jet port means 48. Transitive manifold means 50 further comprises side walls 56 of substantially equal length extending radially from the surface of the intransitive hub in interconnecting relation between first skin means 12 and second skin means 14. Side walls 56 of transitive manifold means 50 need not be continuous, but preferably take the form of a plurality of spaced apart struts 58, as shown in FIG. 7. Additionally, as shown in FIG. 5, it is also desirable to form a rib 60 parallel to third skin means 16 through the center of transitive manifold means 50 and jet port means 48 for the purpose of pre-forming the opening of jet port means 48. Rib 60 is preferably formed from spaced apart struts 58 as shown in FIG. 7 with reference to side walls 56. It is further desirable to form third skin means 16 included within domain spor 26 from spaced apart strut means, as represented by the broken lines in FIGS. 2 and 3.

As best seen in FIGS. 2 and 3, device 10 further comprises first and second fluid flow regulating means, generally indicated as 62 and 64 respectively. First and second fluid flow regulating means 62 and 64 are integrally formed on first skin means 12, second skin means 14 and third skin means 16 in communicating relation to the closed spor means 24. Thus, as shown in FIGS. 2 and 3, one end of each of the fluid flow regulating means 62 and 64 actually defines trailing edge 32. First fluid flow regulating means 62 and second fluid flow regulating means 64 are operably independent one from the other and also from jet port means 48. Trailing edge 32 defined by first and second fluid flow regulating means 62 and 64 is tapered by varying the longitudinal dimension of each fluid flow regulating means with respect to the third skin means 16 of the device. Accordingly, each spor means 24 included within first fluid flow regulating means 62 or second fluid flow regulating means 64 is of different cubic displacement. Of course, correspondingly positioned spor means 24 on opposite sides of device 10 are of substantially equal cubic displacement. It has been determined that this wing-like taper of trailing edge 32 materially enhances the stability and maneuverability characteristics of the device, while at the same time enhancing the self-reefing capabilities of the device.

Fluid flow regulating means 62 and 64 further comprise a corresponding plurality of matrix tri-vent means 68 formed in the second skin means 14 thereof, and a corresponding plurality of second holonomic ports 70 formed in the third skin means 16 thereof. Each of the matrix tri-vent means 68 is defined by a triangular-shaped aperture. Ideally, each tri-vent means 68 is defined by an equilateral triangular-shaped aperture having a perimeter equal to the circumference of the congruent first and second Jordan clusters 34 and 36. An apex of each matrix tri-vent means 68 is oriented towards trailing edge 32. Each of the second holonomic ports 70 is of equal size and elliptical configuration, and one second holonomic port is formed through each third skin means 16 extending between adjacent matrix tri-vent means 68 and third skin means 16' defining side wall extremities of jet port means 48.

As best seen in FIG. 1, control means 72 are provided which operatively interconnect payload means 18 to second skin means 14 and first and second fluid flow regulating means 62 and 64. The demands transmitted from payload means 18 to second skin means 14 and first and second fluid flow regulating means 62 and 64 actually determine the device's path of travel through its environment. Arrow X in FIG. 4 shows the relative movement of first and second fluid flow regulating means 62 and 64 as a result of demands transmitted through control means 72 from payload means 18. As represented by the broken lines in FIG. 4, pulling first and second fluid flow regulating means 62 and 64 downwardly creates a bubble-shaped configuration along second skin means 14 somewhat inboard and transverse to trailing edge 32. This configuration is formed by virtue of control means 72 being attached to second skin means 14 and first and second fluid flow regulating means 62 and 64 inboard of trailing edge 32 substantially in line with apexes of matrix tri-vent means 68. This necessarily allows matrix tri-vent means 68 to function as stabilizers and additionally as conduits for the passage and control of fluid flow pressure, volume and rigidity created within and without the device. Because of the placement and size of the second holonomic ports 70, fluid flow pressure, volume and rigidity created within first and second fluid flow regulating means 62 and 64 are equalized to terms of the remainder of the device. Furthermore, when first and second fluid flow regulating means 62 and 64 are in their normal positions as shown by the solid lines in FIG. 4, matrix tri-vent means 68 function as clusters because of their apex being oriented toward trailing edge 32.

Figure 9:
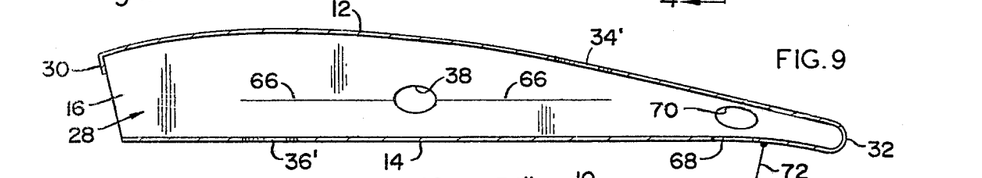
FIG. 9 is a sectional view taken along line 9—9 of FIG. 2.

As best seen in FIG. 9, it has been found desirable to modify the structure of tensor spors 28 effectively resulting in the formation of tensor spors having a cubic displacement substantially greater than that of adjacent spor means 24. The modification is accomplished by splitting third skin means 16 defining the inboard walls of tensor spors 28 longitudinally from points on opposite sides of the corresponding first holonomic ports 38 to points immediately below the circumference of first Jordan clusters 34' and immediately above the circumference of the second Jordan clusters 36' to form fluid passage means 66. This modification provides for the storage of additional quantities of fluid within the device in such fashion that these additional quantities are automatically available to maintain desirable stability and maneuverability characteristics during the device's passage through its environment.

While the device 10 has thus far been described with reference to leading edge 30 being open as shown in FIG. 4, it should also be noted that substantially all of the leading edge may be closed as shown in FIG. 8. Specifically, all of leading edge 30 except that corresponding to reverse transitive manifold means 51 may be closed. Of course, this closure may be affected by extending first skin means 12 downwardly to meet second skin means 14. Additionally, the closure may be affected by extending any applicable material, such as a mesh fabric, between first skin means 12 and second skin means 14 whereby a relatively lesser quantity of fluid is allowed to enter the device. By closing leading edge 30 as shown in FIG. 8, fluid flow pressures created within the device actually reinforce the formation of reverse transitive manifold means 51 in corresponding relation to transitive manifold means 50 in the forward half of the device.

Having thus described the construction of a preferred embodiment of device 10, specific relationships among various elements of the device and the operation of the device will now be discussed. While the specific relationships were originally thought to contribute only to the maneuverability and stability of the device, it has now been determined that these same relationships are of material importance to the air reefing system of the present invention.

As previously pointed out, correspondingly positioned first Jordan clusters 34 and second Jordan clusters 36 are of equal size. Furthermore, the diameter of the largest Jordan clusters 34' and 36' is two times that of the smallest Jordan clusters 34" and 36". Jiro port means 40 is formed at the center of device 10, and its diameter is four times the diameter of largest Jordan clusters 34' and 36'. First Jordan clusters 34 and second Jordan clusters 36 are disposed in first skin means 12 and second skin means 14, respectively, in inverted V configuration. Accordingly, these V configurations intersect at two points, thereby presenting congruent first and second Jordan clusters 34 and 36. The circumference of the elliptical-shaped first holonomic ports 38 is inversely related to the circumference of corresponding first and second Jordan clusters 34 and 36. That is, the smallest first holonomic ports 38 are formed in third skin means 16 defining inboard side walls of tensor spors 28. These smallest first holonomic ports 38 are of a circumference equal to the circumference of first and second Jordan clusters 34" and 36". As the first holonomic ports 38 advance toward the third skin means defining side walls of domain spor 26, they become increasingly larger in circumference in inverse relation to the decreasing circumference of first and second Jordan clusters 34 and 36.

Each of the matrix tri-vent means 68 is of a perimeter equal to the circumference of congruent first and second Jordan clusters 34 and 36. Elliptical-shaped second holonomic ports 70 are each of a circumference equal to that of the congruent first and second Jordan clusters 34 and 36.

Thus, still with reference to this preferred embodiment and with particular reference to FIGS. 2 and 3, this construction presents a flow form device platform defined by the points A, B, C and D. The relatively small area forward of line AB represents an overhanging portion of first skin means 12, and areas aft of line BC represent first fluid flow regulating means 62, jet port means 48 and second fluid flow regulating means 64, respectively.

As shown in FIGS. 2 and 3, it should also be noted that a plane perpendicular to device 10 and intersecting points E and F generates two mirror image quadratic fluid flow forms defined by the points A, B, E and F and C, D, E and F. Moreover, each quadratic fluid flow form comprises four pentahedral fluid flow forms having mutually orthogonal apex vectors disposed about the center G and H, respectively, of each quadratic fluid flow form. For example, one pentahedral fluid flow form is defined by the points A, B and G.

This construction provides an intrinsic parametric transitive flow form device which permits a non-degenerative transformation of fluid flow pressures in a predetermined fluid environment. The device fully utilizes and enhances fluid flow pressures, volumes and rigidity created by its travel through its environment. By virtue of this unique construction, the device "reads" its environment with respect to skin means I, II, and III and payload IV, and skin means I, II and III are self-forming to terms of demands transmitted from payload IV and to changes in its fluid environment. That is, each individual spor means 24 will exhibit varying fluid pressures, fluid volumes and fluid rigidity automatically to maintain maximum desirable characteristics of stability and maneuverability. As will be explained in more detail hereinafter, it is also this self-forming nature of the first, second and third skin means which results in the self-reefing capabilities of device 10.

In operation, the non-rigid construction shown in the drawings requires no external reefing system. Of course, well known staging means are utilized to extract the device from its container and to expose the device to the air. Once exposed, device 10 is self-inflating and exhibits extremely low opening shock. All that is required to obtain a truly unique air reefing system is the addition of air reefing means to device 10, which air reefing means will be fully described hereinafter.

Because of the construction of device 10, self-inflation occurs substantially from the center of the device outwardly. That is, domain spor 26 is first to inflate, and tensor spors 28 are the last of spor means 24 to fully inflate. As previously described in my co-pending application referred to above, this construction results in determinable fluid flow within the device as it travels through its environment. For example, a space of relatively greatest fluid flow pressure, volume and rigidity is defined by the points G, E, H and F as best seen in FIGS. 2 and 3. Corresponding spaces of relatively lesser fluid pressure, volume and rigidity are defined by the points A, B and G and C, D and H. Of course, because first skin means 12, second skin means 14 and third skin means 16 are self-forming to terms of demands transmitted from payload means 18 and changes in the fluid environment, fluid flow pressure, volume and rigidity at individual points within the device are constantly variable in order to maintain the most desirable characteristics of maneuverability and stability as the device travels through its environment. In fact, each air passage formed in the device allows a two-way flow of fluid therethrough. This two-way flow of fluid not only allows device 10 to maintain maximum desirable characteristics of stability and maneuverability while travelling forward, backward, up or down, turning, banking, pitching, yawing and hovering, but also allows device 10 to be self-reefing upon its deployment.

More specifically, upon initial deployment of device 10, fluid enters the device primarily through jiro port means 40. Of course, substantial quantities of air also enter through second Jordan clusters 36 and the open leading edge 30. Thus, device 10 inevitably tends to open from its center, outwardly. To prevent extreme opening shock, transitive manifold means 50, jet port means 48, root cross stem enforcer means 44, and reverse transitive manifold means 51 automatically exhaust excess air. Once domain spor 26 is fully inflated and the intransitive hub is formed, air is automatically directed through first holonomic ports 38 toward tensor spors 28. Flow form device 10 naturally tends to inflate in an accordion-like fashion. As previously stated, because payload means 18 is suspended from the center of device 10, device 10 does not depend upon scooping large quantities of air in through leading edge 30 in order to inflate. In fact, no angle of attack along leading edge 30 is required; rather, device 10 prefers to open perfectly flat.

First and second fluid flow regulating means 62 and 64 also materially enhance the self-reefing characteristics of flow form device 10 upon its deployment. More specifically, wing-like trailing edge 32 defined by fluid flow regulating means 62 and 64 is important to the present air reefing system. By virtue of this taper, spor means 24 adjacent domain spor 26 define the relatively smallest longitudinal dimension with respect to third skin means 16 within device 10, and tensor spors 28 define the relatively greatest such dimension. Thus, spor means 24 adjacent domain spor 26 tend to inflate before more outboard spor means 24, with tensor spors 28 being last to inflate. This necessarily enhances the accordion-like inflation sequence of device 10. Additionally, first and second fluid flow regulating means 62 and 64 tend to bend upwardly, above the plane of first skin means 12, during opening sequence. Matrix trivent means 68 are thereby fully exposed to provide yet additional conduits through which device 10 may exhaust excess air pressures, thus tending to reduce opening shock. Additionally, it must be remembered that second holonomic ports 70 allow each of the first and second fluid flow regulating means 62 and 64 to bleed air pressure, volume, and rigidity across their width, thereby transferring excess air and assisting in a smooth opening sequence from domain spor 26, outwardly.

Accordingly, the construction of the flow form device 10 thus far defined provides the basic air reefing system of the present invention. The addition of various air reefing means to device 10 is made for the purpose of controlling and regulating the self-reefing capabilities of the device. These air reefing means will now be particularly described by reference to various embodiments thereof.

Figures 10, 11, 13, 14, 17, 18:
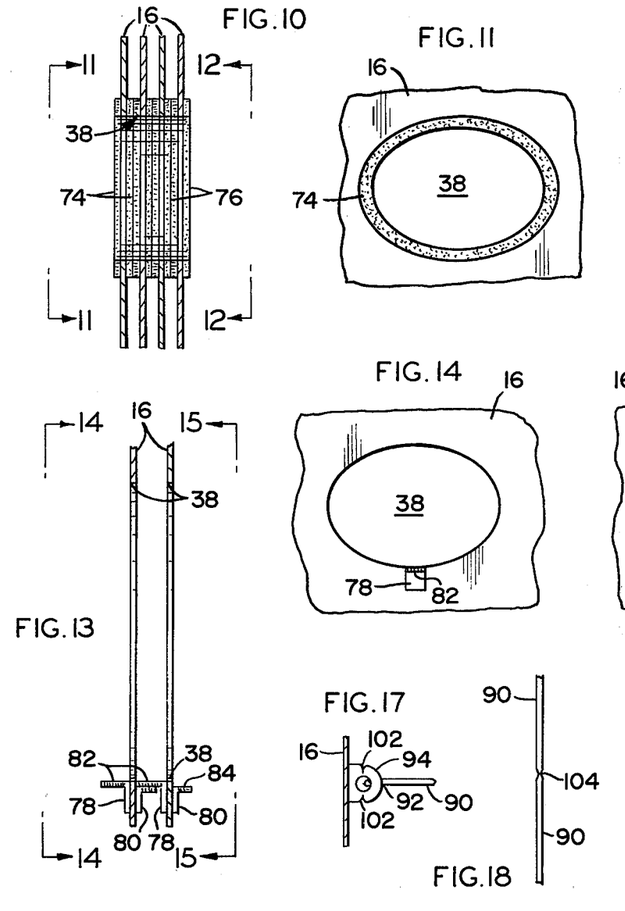
FIG. 10 is a fragmentary sectional view showing one embodiment of the air reefing means of the present invention.
FIG. 11 is a fragmentary elevational view taken along line 11—11 of FIG. 10.
FIG. 13 is a fragmentary sectional view of another embodiment of the air reefing means of the present invention.
FIG. 14 is a fragmentary elevational view taken along line 14—14 of FIG. 13.
FIG. 17 is a detail view showing the fragible attachment means of the present invention.
FIG. 18 is a detail view of a portion of the line retention means showing a weakened portion formed therein.
Figure 12:
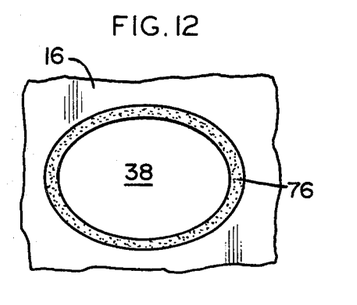
FIG. 12 is a fragmentary elevational view taken along line 12—12 of FIG. 10.

One effective air reefing means is illustrated by the drawings of FIGS. 10, 11 and 12. That embodiment comprises a plurality of male fastener means 74 disposed in mating relation to female fastener means 76 on third skin means 16 along substantially the entire perimeter of adjacent pairs of first holonomic ports 38. While male and female means 74 and 76 are preferably formed from "Velcro" material, it should be obvious that any applicable self-actuating fastening means such as snaps may be employed. While adjacent first holonomic ports 38 are of different sizes, it is obvious that the width of male fastener means 74 may be relatively greater than that of the adjacent female fastener means 76, in order to insure a mating, abutting relation therebetween. When device 10 is folded for packing, corresponding male and female fastening means 74 and 76 engage, tending to retain the device in a folded, accordion-like configuration. The natural inflation of device 10 upon its deployment will now be controlled from spor means 24 to spor means 24 because sufficient air flow pressure, volume and rigidity must now be obtained within an individual spor means 24 to break the abutting connection between corresponding male and female fastener means 74 and 76, thus allowing the next outboard spor means 24 to inflate.

It should be noted that this air reefing means comprising male fastener means 74 and female fastener means 76 is completely self-disengaging. Additionally, there is virtually no change of this air reefing means becoming tangled or creating frictional heat which could damage device 10.

Figure 15:
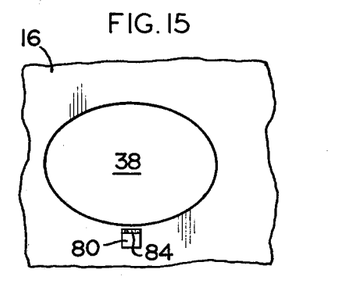
FIG. 15 is a fragmentary elevational view taken along line 15—15 of FIG. 13.

FIGS. 13, 14 and 15 illustrate another embodiment for the air reefing means of the present invention. Similar to the means described above, this embodiment comprises male fastener means 78 disposed in mating relation with female fastener means 80 on third skin means 16. As best seen in FIG. 13, male and female fastener means 78 and 80 are attached to skin means 16 so as to provide corresponding male arms 82 and female arms 84 extending substantially perpendicular to third skin means 16. When device 10 is folded for packing, corresponding male and female fastener means 78 and 80 engage with male arm 82 overlapping corresponding female arm 84. Of course, greater air flow pressure, volume and rigidity are required to disengage such an overlapping connection. It should be obvious that the forces required for disengagement may be controlled by varying the width of corresponding male and female arms 82 and 84, or by varying the extent to which they overlap.

As above, it should be noted that this air reefing means is completely self-disengaging. Again, there is virtually no change of the means becoming tangled or creating frictional heat which could damage the device.

Figure 19:
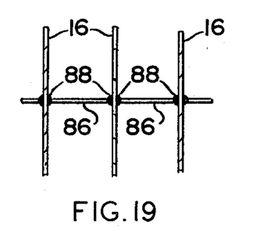
FIG. 19 is a fragmentary sectional view showing air reefing means comprising biasing means.

With particular reference to FIG. 19, there is disclosed therein air reefing means comprising at least one biasing means 86 disposed in interconnecting relation between adjacent pairs of third skin means 16 defining side walls of spor means 24. Biasing means 86 are preferably formed from substantially elastic material of predetermined length such that adjacent third skin means 16 are normally urged one toward the other. Thus, device 10 necessarily tends to fold in upon itself in an accordion-like manner. It is furthermore desirable to attach biasing means 86 to third skin means 16 frangibly at attachment points 88, whereby biasing means 86 will automatically disengage upon substantially full inflation of device 10. It should be obvious that automatic disengagement could also be accomplished as by pre-forming a weakened portion at a predetermined point along the length of biasing means 86.

This embodiment serves to enhance the natural reefing tendencies of device 10 by requiring that sufficient air pressure, volume and rigidity be created within each spor means 24 to overcome biasing means 86 as the device naturally inflates from its middle, outwardly. The relative effect of this air reefing means may of course be controlled by varying the biasing force exerted by biasing means 86. Finally, it should be noted that biasing means 86 need not extend between adjacent third skin means 16. Rather, biasing means 86 may extend between any pair of third skin means 16 by passing biasing means 86 through first holonomic ports 38. For example, a biasing means 86 interconnecting outermost third skin means 16 is indicated in broken lines in FIG. 16.

Figure 16:
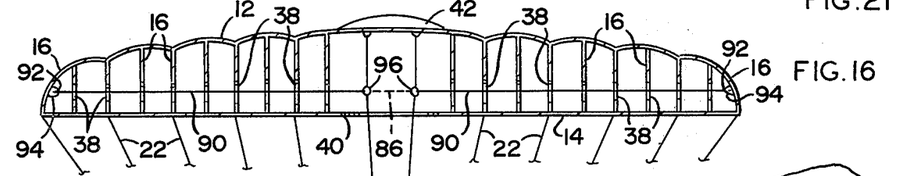
FIG. 16 is a sectional view showing the line retention means embodiment of the air reefing means.

Yet another embodiment for the air reefing means of the present invention is illustrated in FIG. 16. The means shown therein comprises two retention line means 90 disposed at least partially within device 10 in interconnecting relation between outermost third skin means 16. One retention line means 90 is attached at one end 92 thereof to oppositely disposed outermost third skin means 16 by attachment means 94. Two guide means 96 are disposed within the device and depend from substantially the mid-point of first skin means 12. Each of the retention line means 90 extends from the outermost third skin means 16 through holonomic ports 38, through one of guide means 96 and to the exterior of device 10 through jiro port means 40. At a predetermined point outside device 10 connector means 98 is formed whereby retention line means 90 are joined together. Lanyard means 100 extends from connector means 98 in substantially co-extensive relation with control means 72 and shroud lines 22. When device 10 is folded and lanyard means 100 is pulled downwardly, a contracting force is exerted on each of outermost third skin means 16 by retention line means 90, tending to fold the device in an accordion-like fashion. In operation, retention line means 90 retard the natural reefing tendencies of device 10 by utilizing the weight of payload means 18 depending from device 10 to transmit contracting forces to outermost third skin means 16. The contracting forces are transmitted, of course, by attaching lanyard means 100 to payload means 18. Thus, as device 10 self-inflates, sufficient air pressure, volume and rigidity must be maintained to overcome the pull of payload means 18.

To provide for automatic disengagement of air reefing means comprising line retention means 90, attachment means 94 is preferably formed to break upon substantially full inflation of the device. As best seen in FIG. 17, this may be accomplished by forming attachment means 94 to include fracture lines 102. When device 10 is substantially fully inflated, sufficient force will be exerted on attachment means 94 by retention line means 90 to break attachment means 94 at fracture lines 102. Of course, substantially the same result could be accomplished simply by forming attachment means 94 from a frangible material. Alternatively, as best seen in FIG. 18, automatic disengagement may be accomplished by forming retention line means 90 to include at least one weakened portion 104 therein. Upon substantially full inflation of device 10, sufficient force would be exerted along retention line means 90 to cause a break at weakened portion 104.

Still with reference to the embodiment shown in FIG. 16, it may be desirable to form retention line means 90 from substantially elastic material. It may furthermore be desirable to form lanyard means 100 at least partially from elastic material. Of course, either method would provide yet additional forces tending to fold device 10 in an accordion-like fashion. During its opening sequence device 10 would then not only have to overcome the weight of payload means 18, but also the biasing force of the applicable elastic member. Accordingly, self-reefing would be enhanced.

Figure 20:
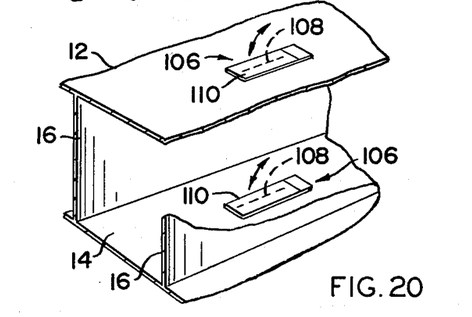
FIG. 20 is a fragmentary isometric view showing air reefing means comprising slit means.

The reefing capabilities of flow form device 10 may further be controlled and enhanced by air reefing means comprising a plurality of slit means, generally indicated as 106 in FIG. 20, formed at predetermined points through first skin means 12 and second skin means 14. Slit means 106 comprise a plurality of slits 108, and may comprise a plurality of flap means 110 disposed in overlapping relation thereto. Slits 108 may be of virtually any size and configuration. They may be substantially parallel to third skin means 16 as shown in FIG. 20. They may be substantially perpendicular to third skin means 16. In fact, slits 108 may define virtually any angle with respect to third skin means 16, and may be arc-shaped. However, the relative placement of slits 108 with respect to the platform defined by points A, B, C, and D, is predetermined by the overall configuration of device 10.

Specifically, slits 108 are to be formed in first skin means 12 and second skin means 14 outside the area of relatively greatest fluid pressure, volume and rigidity. That is, slits 108 are to be formed in the platform outside the area defined by points E, H, F and G. Additionally, in those constructions employing flap means 110, flap means 110 must be disposed as shown in FIG. 20. That is, flap means 110 formed in overlapping relation to slits 108 formed through first skin means 12 must be formed on the exterior of first skin means 12. Similarly, flap means 110 formed in overlapping relation to slits 108 through second skin means 14 must be formed on the interior of second skin means 14.

Upon deployment of a device utilizing slit means 106 shown in FIG. 20, flap means 110 open to allow air to pass through slits 108. Once device 10 is fully inflated, flap means 110 close to seal slits 108, thus effectively disengaging this air reefing means automatically. Because slit means 106 primarily function as exhaust ports to reduce opening shock, it is intended that they be used primarily in combination with extremely heavy payload means 18. It is obvious that this embodiment has virtually no chance of tangling, tearing or burning device 10, for it includes no reefing lines whatsoever.

It has also been determined that the reefing capabilities of flow form device 10 are enhanced by wetting device 10 prior to its deployment. Wetting may be accomplished by any non-corrosive liquid or gel; however, water is preferred for reasons of economy and availability. Wetting device 10 prior to its deployment serves several distinct functions in enhancing the natural reefing tendencies of the device. Self-reefing characteristics are enhanced by the resultant cooling as device 10 rubs against itself during the inflation sequence. Wetting device 10 also adds to its weight, which results in improved self-reefing characteristics without adversely affecting its flight characteristics. Of course, wetting device 10 further enhances its self-reefing capabilities by virtue of the cohesive attraction between water molecules interconnecting folded layers of the device. As device 10 naturally inflates from its center, sufficient air pressure, volume and rigidity must be generated to overcome the water's forces of cohesion, thus slowing full inflation and reducing opening shock.

Figure 21:
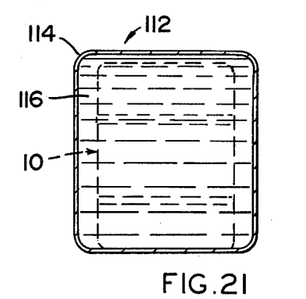
FIG. 21 is a sectional view of the liquid jacket means.

Accordingly, in another embodiment the air reefing means of this invention may comprise liquid jacket means generally indicated a 112 in FIG. 21. Liquid jacket means 112 comprises a liquid-tight container means 114 into which flow form device 10 is releasably packed. Of course, container means 114 is filled with liquid 116 prior to sealing device 10 therein.

Finally, the air reefing means of the present invention may comprise a plurality of closure means formed at predetermined points across leading edge 30 of device 10. By selectively closing portions of leading edge 30 less air is available to inflate device 10. Accordingly, device 10 inflates more slowly, and opening shock is correspondingly reduced. As previously discussed with specific reference to FIG. 8, it is intended that the closure means of this embodiment may be formed from any applicable material providing a relatively lesser flow of air into device 10. It is furthermore contemplated that corresponding portions of leading edge 30 be closed in each half of device 10 as defined by the lines AF and DF. Furthermore, no portion of leading edge 30 corresponding to reverse transitive manifold means 51 is closed. For example, corresponding spor pairs generally indicated as Y in FIG. 3 may be closed at leading edge 30. Additionally, corresponding spor pairs generally indicated as Z in FIG. 3 may be similarly closed.

While each of the foregoing air reefing means has been discussed as a separate entity, it must be remembered that the air reefing system of the present invention may comprise any combination of these air reefing means in combination with a flow form device. Similarly, while the air reefing system has been described with reference to a preferred embodiment, it is intended that device 10 may be constructed in any known geometric configuration or combinations thereof. Specifically, any of the individual elements of device 10 may be varied with regard to both its size and placement so long as the remaining elements are correspondingly varied. So long as device 10 is so constructed, the air reefing system claimed herein, and specifically the air reefing means, may be constructed and will function substantially as described herein.

It will thus be seen that objects made apparent from the preceding description are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. An air reefing system of the type to be used in combination with a flexible flow form device, said system comprising: a first skin means of predetermined configuration; a second skin means of predetermined configuration disposed in substantially spaced apart relation from said first skin means; a plurality of third skin means disposed in interconnecting relation between said first and second skin means; at least one spor means defined by said first, second and third skin means, one end of said spor means at least partially defining a leading edge of said device, at least a portion of said spor means being closed at its opposite end to at least partially define the trailing edge of said device; a plurality of first Jordan clusters formed in said first skin means; a plurality of second Jordan clusters formed in said second skin means; a plurality of holonomic ports formed in said third skin means; a jet port means defined by at least a portion of said one spor means being open at its aft end; a jiro port means formed in said second skin means; control means operatively connected with said second skin means; and air reefing means disposed on said device, whereby said device is self-reefing upon its exposure to predetermined fluid flow.

2. An air reefing system as in claim 1 wherein said air reefing means comprises at least one biasing means disposed in interconnecting relation between pairs of said third skin means defining side walls of said spor means, whereby said pairs are urged one toward the other.

3. An air reefing system as in claim 2 wherein said biasing means is frangibly attached to said third skin means, whereby said biasing means is automatically disengaged upon substantially full inflation of said device.

4. An air reefing system as in claim 1 wherein said air reefing means comprises retention line means disposed at least partially within said device in interconnecting relation between pairs of said third skin means.

5. An air reefing system as in claim 4 wherein said air reefing means comprises retention line means disposed at least partially within said device in interconnecting relation between the outermost of said third skin means.

6. An air reefing system as in claim 4 wherein said retention line means comprises a plurality of lines, at least one of said plurality being attached at one end thereof to the interior surfaces of said pairs of said third skin means; a plurality of guide means disposed within said device and depending from substantially the midpoint of said first skin means; at least one aperture formed through said second skin means in corresponding relation to said guide means, each of said plurality of lines extending from said outermost third skin means through said holonomic ports, through one of said plurality of guide means, and through said aperture to the exterior of said device; connector means formed at a predetermined point outside said device whereby said plurality of lines are joined; and lanyard means extending from said connector means.

7. An air reefing system as in claim 6 wherein said plurality of lines are frangibly attached at said one end to said pairs of said third skin means.

8. An air reefing system as in claim 6 wherein said plurality of lines are formed from substantially elastic material, whereby said pairs of said third skin means are normally urged one toward the other.

9. An air reefing system as in claim 6 wherein said lanyard means is at least partially formed from substantially elastic material, whereby said pairs of said third skin means are normally urged one toward the other when the free end of said lanyard means is attached to a payload means depending from said device.

10. An air reefing system as in claim 6 wherein the free end of said lanyard means is attached to a payload means depending from said device and is restrainingly stowed to normally urge said pairs of said third skin means one toward the other.

11. An air reefing system of the type to be used in combination with a flexible flow form device, said system comprising: a first skin means of predetermined configuration; a second skin means of predetermined configuration disposed in substantially spaced apart relation from said first skin means; a plurality of third skin means disposed in interconnecting relation between said first and second skin means; at least one spor means defined by said first, second and third skin means one end of said spor means at least partially defining a leading edge of said device, at least a portion of said spor means being closed at its opposite end to at least partially define the trailing edge of said device; a plurality of first Jordan clusters formed in said first skin means; a plurality of second Jordan clusters formed in said second skin means; a plurality of holonomic ports formed in said third skin means; a jet port means defined by at least a portion of said one spor means being open at its aft end; a jiro port means formed in said second skin means; at least first and second fluid flow regulating means connected to said first, second and third skin means in fluid communicating relation to said closed portion of said spor means, one end of said fluid flow regulating means at least partially defining said trailing edge, each of said fluid flow regulating means being operably independent one from another; control means operatively connected with said second skin means and said first and second fluid flow regulating means; and air reefing means disposed on said device, whereby said device is self-reefing upon its exposure to predetermined fluid flow.

* * * * *